(12) United States Patent
Takano et al.

(10) Patent No.: US 9,106,060 B2
(45) Date of Patent: Aug. 11, 2015

(54) SHEATHING MATERIAL

(71) Applicant: Yazaki Corporation, Tokyo (JP)

(72) Inventors: Yoichi Takano, Makinohara (JP); Hiroe Norizuki, Makinohara (JP); Masaaki Sawairi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/162,907

(22) Filed: Jan. 24, 2014

(65) Prior Publication Data

US 2014/0212629 A1 Jul. 31, 2014

(30) Foreign Application Priority Data

Jan. 28, 2013 (JP) ................................. 2013-013470

(51) Int. Cl.
*H02G 3/04* (2006.01)
(52) U.S. Cl.
CPC ....... *H02G 3/0468* (2013.01); *Y10T 428/24612* (2015.01)
(58) Field of Classification Search
CPC ............ H01B 7/17; H01B 13/12; H01B 7/18; H01B 7/28; H01B 7/29; B32B 3/12; B29C 59/02; B29C 59/04; H02G 3/0468
USPC ......... 428/174, 178, 179, 181, 182, 183, 184, 428/185, 116, 118, 156, 172; 174/72 A, 70 R
See application file for complete search history.

(56) References Cited

U.S. PATENT DOCUMENTS

| 3,825,412 | A | * | 7/1974 | Mullender | ..................... 428/604 |
| 4,049,855 | A | * | 9/1977 | Cogan | ............................ 428/116 |
| 6,034,329 | A | | 3/2000 | Kawamura | |
| 6,078,009 | A | | 6/2000 | Kawamura | |
| 6,137,055 | A | | 10/2000 | Kawamura | |
| 6,317,968 | B1 | | 11/2001 | Kawamura | |
| 2011/0070405 | A1 | * | 3/2011 | Schaety et al. | ................ 428/170 |

FOREIGN PATENT DOCUMENTS

JP 10136531 A 5/1998
JP 2003259528 A 9/2003

* cited by examiner

*Primary Examiner* — Maria Veronica Ewald
*Assistant Examiner* — Joanna Pleszczynska
(74) *Attorney, Agent, or Firm* — Sughrue Mion, PLLC

(57) ABSTRACT

A sheathing material includes a sheet base material on which a plurality of concave portions is regularly formed to be adjacent to each other by embossing processing. Each concave portion includes a polygonal lattice portion that includes a pair of V-shaped ridgelines, when seen from a plan view of the sheathing material, which is symmetrically arranged with respect to a symmetrical axis so that opening-sides of the V-shaped ridgelines are opposed to each other and is formed on a front side surface of the sheet base material, and a trough portion that includes a pair of inclined folding lines extending to come close to each other and inclined towards a backside of the sheet base material from respective apexes of the V-shaped ridgelines, when seen from the plan view, and a horizontal folding line connecting tips of the inclined folding lines.

6 Claims, 11 Drawing Sheets

SHEATHING MATERIAL

CROSS REFERENCE TO RELATED APPLICATION

This application is based on Japanese Patent Application No. 2013-013470 filed on Jan. 28, 2013, the contents of which are incorporated herein by reference.

BACKGROUND OF THE INVENTION

1. Technical Field

The invention relates to a sheathing material.

2. Background Art

A variety of sheathing materials are attached to a wire harness for a vehicle, for example. As the sheathing material, a corrugated tube that has high wear resistance and can be freely bent to follow an arranging path is used in many cases (for example, refer to JP-A-10-136531).

The corrugated tube has a bellows shape of which concavo-convex portions having large and small diameters are alternately formed in an axis line direction. Thereby, the wire harness inserted therein has a reduced contact area with other members due to the concave and convex portions and has an increased distance from the other members due to the convex portions, so that it delays a damage of an electric wire covering, for example.

In addition, a cylindrical sheathing material for which linearity retention is required, a sheathing material having a hole through which a branch harness is drawn out, a protector having impact resistance and the like may be compositely attached to the wire harness.

When the wear resistance, the linearity, the bendability (flexibility) and the electric wire branch are required by other portions of the wire harness, a variety of members are mounted to the sheathing material in conformity to the requirements. As a result, the number of components and the processing man-hour are increased.

Also, the corrugated tube has the high wear resistance and bendability but has an unevenness shape. Hence, when carrying the long corrugated tube with being wound, a volume thereof is increased to increase the logistics cost.

Regarding this, a sheathing material has been suggested in which a sheath material (a sheet base material) having a sheet shape is rolled into a cylindrical shape to thus reduce the logistics cost (for example, refer to JP-A-2003-259528).

That is, since the sheath material having a sheet shape can be conveyed with being stacked, a volume thereof is not increased, so that the conveying efficiency thereof is high. For this reason, it is also considered to convey the corrugated tube in a form of a corrugated plate sheet having concave and convex portions alternately arranged and then to roll the same into a cylindrical shape.

Incidentally, when it is intended to configure the bellow-shaped corrugated tube from the sheet base material, the corrugated plate sheet having concave and convex portions alternately arranged should be rolled into a cylindrical shape so that the concave and convex portions are alternately arranged in a tube axis line direction. Thereby, the concave and convex portions exhibit the structural stiffness, so that it is difficult to manufacture a freely bendable corrugated tube.

Hence, according to the sheathing material disclosed in JP-A-2003-259528, a flat plate-shaped sheath material is provided with a thin hinge part continuing in an X direction over the concave and convex portions and the thin hinge part is formed at a predetermined pitch in a Y direction, so that the sheathing material is wound in the Y direction to form a circular ring shape. However, it is difficult to continuously mold the concavo-convex shaped corrugated plate sheet having the thin hinge part by a low-price processing method such as embossing processing, so that the manufacturing cost is increased.

The invention has been made keeping in mind the above situations, and an object of the invention is to provide a sheathing material capable of reducing the manufacturing and logistics costs.

SUMMARY OF THE INVENTION

The object of the invention is realized by following configurations.

(1) According to an aspect of the invention, a sheathing material includes a sheet base material on which a plurality of concave portions is regularly formed to be adjacent to each other by embossing processing. Each concave portion includes a polygonal lattice portion that includes a pair of V-shaped ridgelines, when seen from a plan view of the sheathing material, which is symmetrically arranged with respect to a symmetrical axis so that opening-sides of the V-shaped ridgelines are opposed to each other and is formed on a front side surface of the sheet base material, and a trough portion that includes a pair of inclined folding lines extending to come close to each other and inclined towards a backside of the sheet base material from respective apexes of the V-shaped ridgelines, when seen from the plan view, and a horizontal folding line connecting tips of the inclined folding lines.

According to the sheathing material having the above configuration (1), the concave portions that are regularly adjacent are formed on the surface of the sheet base material by the embossing processing and the ridgelines of the concave portions are arranged on the same plane as the surface. Hence, the surface and backside of the sheet base material are formed with the unevenness for securing wear resistance by the low-price embossing processing.

Also, on the surface of the sheet base material, the polygonal lattice portions where the concave portions, each of which having the pair of V-shaped ridgelines, when seen from the plan view, are regularly arranged in a line in horizontal and vertical directions, and the inclined folding lines and the horizontal folding lines of the trough portions becoming the continuous folding lines are configured. Thus, the sheathing material having the concave portions formed on the sheet base material can be easily bent about the horizontal folding lines or an orthogonal line orthogonal to the horizontal folding lines, so that it can be rolled into a cylinder shape. Hence, the sheathing material made of the sheet base material can be conveyed with being stacked, so that a volume thereof is not increased and the conveying efficiency is thus improved.

Furthermore, since the trough portion has the horizontal folding line, a crest portion protruding from the backside, which results from the concave portion, can be configured not to be sharp. That is, the crest portions, which protrude from the backside of the sheet base material and are contacted to a part to be sheathed or an external component, are formed to have a back shape of a horse, for example, so that a contact area of the sheathing material is increased. Thereby, the sheathing material can suppress the part to be sheathed (for example, a covered electric wire) or the external component (for example, another wire harness) from being damaged due to the crest portions.

(2) In the sheathing material of (1), the concave portion has horizontal ridgelines that connect respective V-shaped opening-side ends of the V-shaped ridgelines and extend in parallel with the horizontal folding line, when seen from the plan view.

According to the sheathing material having the above configuration (2), the V-shaped ridgelines are connected through the horizontal ridgelines and the lattice portion of the concave portion has a polygonal shape, when seen from the plan view. The lattice portion of the concave portion having a polygonal shape, when seen from the plan view, has such a configuration that each apex of the V-shaped ridgeline is formed by intersecting three ridgelines, when seen from the plan view and can be easily processed upon the embossing processing, compared to a configuration where each apex of a V-shaped ridgeline of a lattice portion of a concave portion, which has a rhombic shape and does not have a horizontal ridgeline, when seen from the plan view, is formed by intersecting four ridgelines.

(3) In the sheathing material of (1) or (2), the sheathing material is bent towards a backside of the sheet base material along the horizontal folding line to be formed into a cylinder shape and is wound onto an outer peripheral surface of at least one electric wire.

According to the sheathing material having the above configuration (3), when the sheathing material is bent towards the backside of the sheet base material along the horizontal folding line and is thus formed into the cylinder shape having a central axis line following an orthogonal line orthogonal to the horizontal folding lines, a pair of opposing inner surfaces of the concave portion is arranged along the central axis line of the cylinder. When the cylindrical sheathing material is bent so that both axial ends thereof come close to each other, the stress expanding and contracting the opposing inner surfaces is applied to the concave portion. At this time, the concave portion opening towards an outer peripheral surface can be easily deformed and a deformation amount thereof is thus large in a direction along which the pair of opposing inner surfaces comes close to or separates from each other. For this reason, it is possible to easily bend the cylindrical sheathing material. Hence, it is possible to easily obtain the cylindrical sheathing material that can be freely bent to follow an arranging path of an electric wire.

In contrast, when the sheathing material is rolled to bend towards the surface of the sheet base material along the horizontal folding lines and is thus formed into the cylinder shape having a central axis line following the orthogonal line orthogonal to the horizontal folding lines, the pair of opposing inner surfaces of the concave portion is arranged along the central axis line direction of the cylinder. When the cylindrical sheathing material is bent to bring both axial ends close to each other, the stress expanding and contracting the opposing inner surfaces is applied to the concave portion. At this time, since the concave portion opening towards an inner peripheral surface of the cylinder shape is not easily deformed and the deformation amount is thus small in a direction along which the pair of opposing inner surfaces comes close to or separates from each other, it is not possible to easily bend the cylindrical sheathing material. Therefore, when the sheathing material is rolled to bend towards the surface of the sheet base material along the horizontal folding lines, the sheathing material can be used as a cylindrical sheathing material that is used in an arranging path of an electric wire for which linearity retention is required.

Also, when the sheathing material is rolled to bend towards the backside or surface of the sheet base material along the orthogonal line orthogonal to the horizontal folding lines and is thus formed into the cylinder shape having a central axis line following the horizontal folding lines, a pair of apexes is arranged along the central axis line direction of the cylinder. When the cylindrical sheathing material is bent to bring both axial ends close to each other, the stress expanding and contracting the apexes of the concave portion is applied to the concave portion. At this time, since the concave portion is difficult to be deformed and the deformation amount is thus small in a direction along which the pair of apexes comes close to or separates from each other, the cylindrical sheathing material is not easily bent. Therefore, when the sheathing material is rolled to bend towards the backside or surface of the sheet base material along the orthogonal line orthogonal to the horizontal folding lines, the sheathing material can be used as a cylindrical sheathing material that is used in an arranging path of the electric wire for which linearity retention is required.

(4) According to an another aspect of the invention, a wire harness includes the sheathing material of any one of (1) to (3) and at least one electric wire having an outer peripheral surface on which the sheathing material is wound.

According to the wire harness having the above configuration (4), it is possible to obtain the inexpensive wire harness of which the manufacturing and logistics costs are reduced.

According to the sheathing material of the invention, the sheet base material on which the unevenness is formed by the low-price embossing processing can be conveyed with being stacked and the manufacturing and logistics costs can be reduced.

The invention has been briefly described. In addition, the details of the invention will be more clarified by reading illustrative embodiments for implementing the invention with reference to the accompanying drawings.

DESCRIPTION OF PREFERRED EMBODIMENT

Hereinafter, illustrative embodiments of the invention will be described with reference to the drawings.

Figure 1:
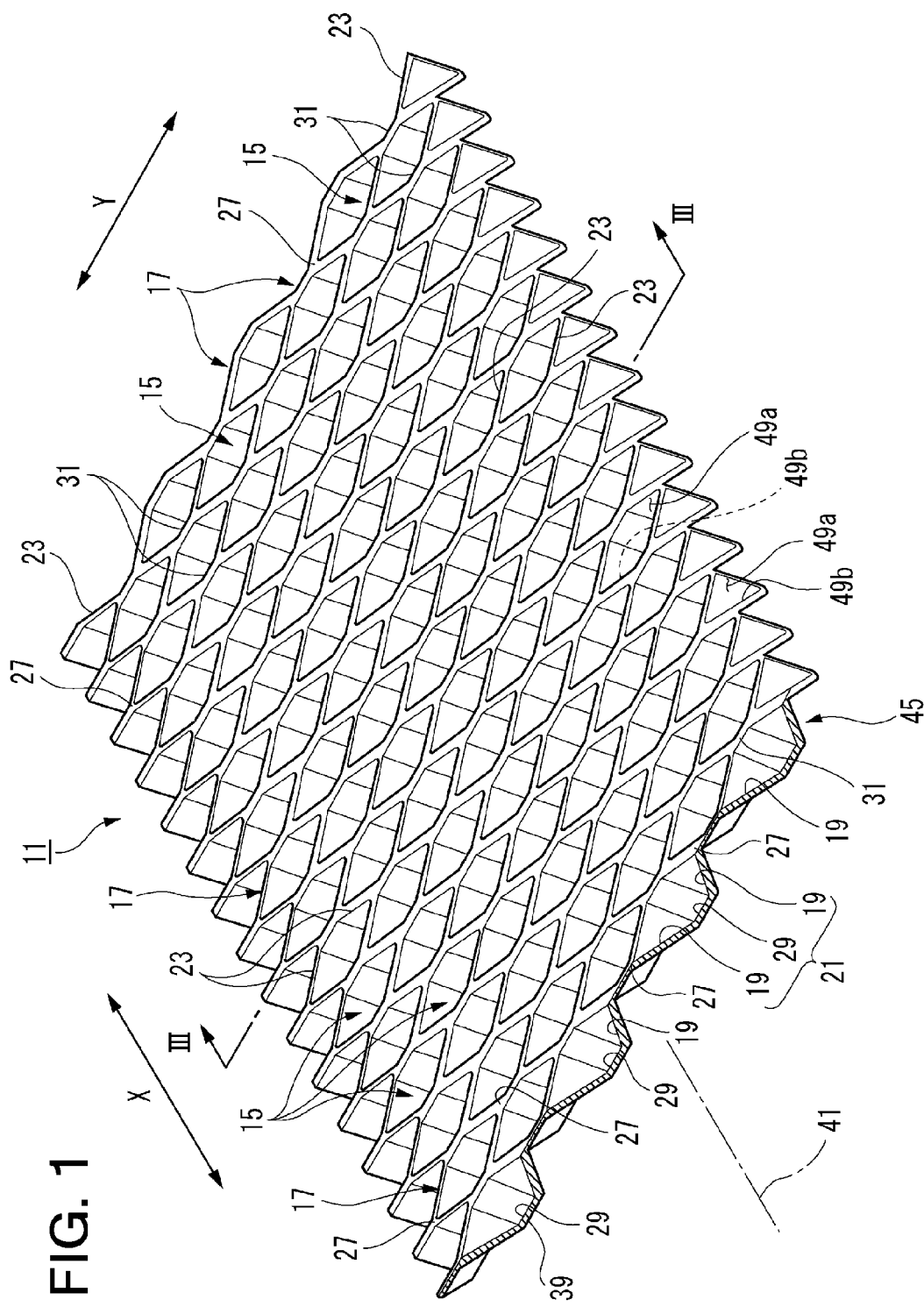
FIG. 1 is a perspective view seen from a surface of a part of a sheathing material according to an illustrative embodiment of the invention.

As shown in FIG. 1, a sheathing material 11 according to a first illustrative embodiment of the invention has a configuration where a plurality of concave portions 15, which are formed to have the same shape by embossing processing, is regularly and continuously formed to be adjacent in horizontal and vertical directions (X and Y directions) on a surface of a long sheet base material (not shown) that is slit at a predetermined width. In the shown example, the concave portions 15 are arranged in a zigzag shape.

Each concave portion 15 has a lattice portion 17 and a trough portion 21.

Figure 2:
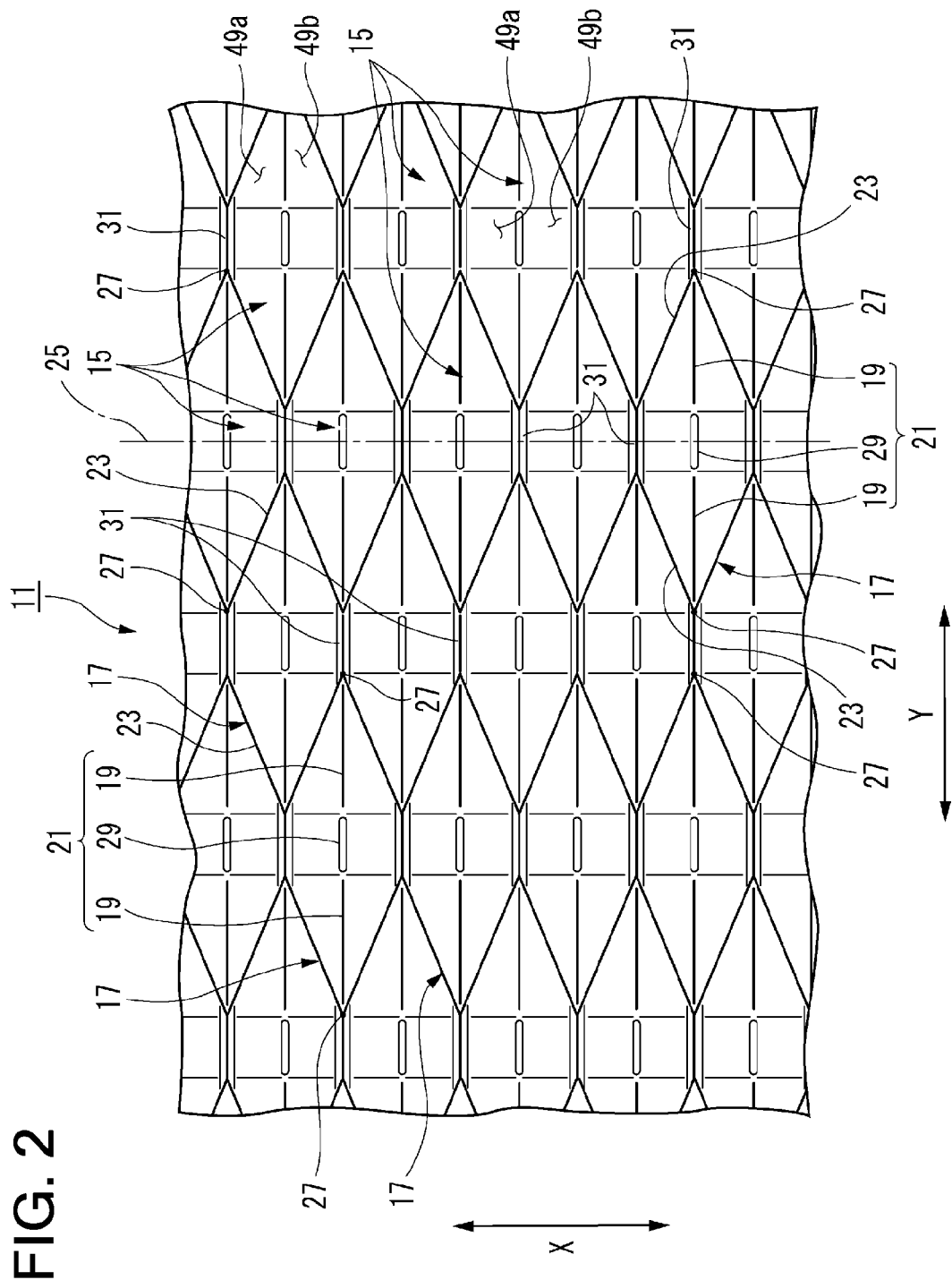
FIG. 2 is a plan view of the sheathing material shown in FIG. 1.

As shown in FIG. 2, in the first illustrative embodiment, each lattice portion 17 has a pair of V-shaped ridgelines 23, when seen from the plan view, is symmetrically arranged with respect to a boundary line 25 extending in a sheet width direction (X direction) so that V-shaped opening sides thereof are opposed to each other, and forms a polygon on the surface of the sheet base material.

Figure 3:
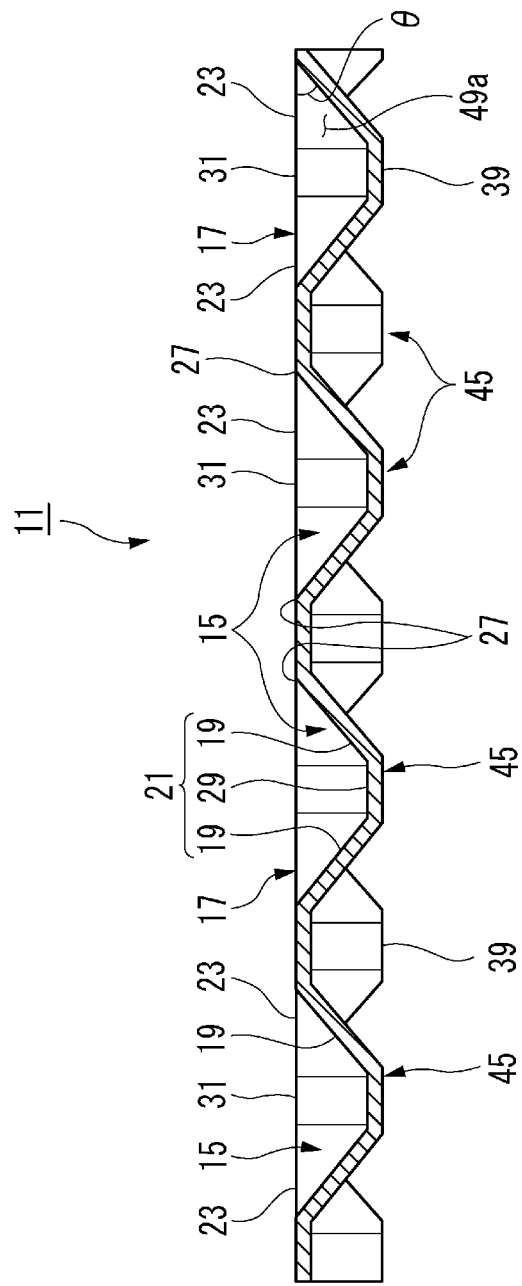
FIG. 3 is a sectional view taken along an arrow III-III of the sheathing material shown in FIG. 1.

In the first illustrative embodiment, as shown in FIG. 3, each trough portion 21 has a pair of inclined folding lines 19, which extend to come close to each other with being inclined towards a backside of the sheet base material (towards the lower, in FIG. 3) from respective apexes 27 of the V-shaped ridgelines 23, when seen from the plan view, and a horizontal folding line 29 connecting tips of the inclined folding lines 19. Meanwhile, in this illustrative embodiment, since the horizontal folding line 29 is molded by a molding tool having a rounding part at a tip thereof so that it does not fracture the sheet base material upon the embossing processing, it is formed into a recess shape having a predetermined width, as shown in FIG. 2.

In the first illustrative embodiment, the concave portion 15 of the sheathing material 11 has horizontal ridgelines 31 that connect the respective V-shaped opening-side ends of the V-shaped ridgelines 23 and extend in parallel with the horizontal folding line 29, when seen from the plan view. Thus, the concave portion 15 has such a configuration that the pair of V-shaped ridgelines 23 is connected by the horizontal ridgelines 31, when seen from the plan view, and as shown in FIG. 2, the lattice portion 17 of the recess portion 15 has a hexagonal shape, when seen from the plan view. The lattice portion 17 of the recess portion 15 having a hexagonal shape, when seen from the plan view, has such a configuration that each apex 27 of the V-shaped ridgeline 23 is formed by intersecting three ridgelines, when seen from the plan view.

Figure 4:
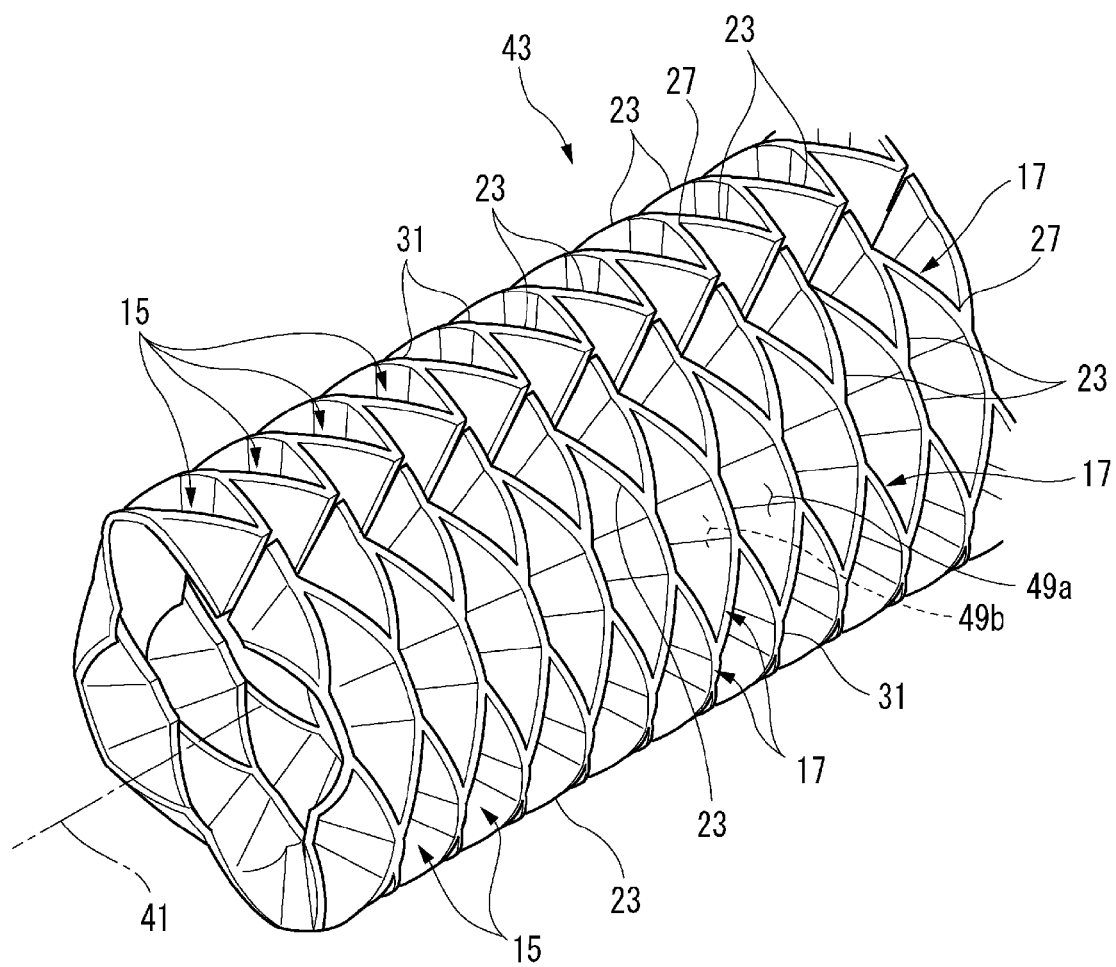
FIG. 4 is a partial perspective view of a cylindrical sheathing material that is formed into a cylindrical shape by bending the sheathing material towards a backside of a sheet base material along horizontal folding lines of concave portions.

Also, in this illustrative embodiment, the sheathing material 11 is used as a cylindrical sheathing material 43 that is formed by forming the recess portions 15 on the surface of the sheet base material made of a thermoplastic resin by the embossing processing and then hot forming the same into a pipe shape, as shown in FIG. 4. However, the sheathing material may be formed of an elastic material having flexibility enough to be bent or rolled by a persons' force.

That is, the sheathing material 11 may be formed of an appropriate material, depending on using methods. In addition to the synthetic resin or silicon, the various sheet base materials such as paper, metal, fabric, resin-impregnated fiber and the like may be used.

In the below, operations of the sheathing material 11 having the above configuration are described.

According to the sheathing material 11 of the first illustrative embodiment, the concave portions 15, which are regularly adjacent to each other, are formed on the surface of the sheet base material by the embossing processing, and the pair of V-shaped ridgelines 23 are connected through the horizontal ridgelines 31, when seen from the plan view, so that the hexagonal lattice portions 17 becoming the ridgelines of the concave portions 15 are arranged on the same plane as the surface of the sheet base material. That is, when seeing the sheathing material 11 from the backside with the inside and outside thereof reversed, the concave portions 15 are formed, so that crest portions 39 (refer to FIG. 3) protrude from the backside. Hence, the surface and backside of the sheathing material 11 made of the sheet base material are formed with the unevenness for securing the wear resistance by the low-price embossing processing.

Also, on the surface of the sheathing material 11, the hexagonal lattice portions 17 where the concave portions 15, each of which having the pair of V-shaped ridgelines 23 and the horizontal ridgelines 31, when seen from the plan view, are regularly arranged in horizontal and vertical directions, and the inclined folding lines 19 and the horizontal folding lines 29 of the trough portions 21 becoming the continuous folding lines are configured. Thus, compared to the sheathing material of the related art where the corrugated plate sheet having the concave and convex portions alternately arranged is rolled so that the concave and convex portions are alternately arranged in the tube axis line direction, the sheathing material 11 having the concave portions 15 formed on the sheet base material can be easily bent about the horizontal folding lines 29 or an orthogonal line 41 orthogonal to the horizontal folding lines 29, so that it can be rolled into a polygonal cylinder shape. Hence, the sheathing material 11 made of the sheet base material can be conveyed with being stacked, so that a volume thereof is not increased and the conveying efficiency is thus improved.

Furthermore, the trough portion 21 has the horizontal folding line 29, so that the crest portion 39 protruding from the backside, which results from the concave portion 15, can be configured not to be sharp. That is, the crest portions 39, which protrude from the backside of the sheet base material and are contacted to a covered electric wire 61, which is a part to be sheathed, or another wire harness, which is an external component, are formed to have a back shape of a horse, for example, so that a contact area of the sheathing material is increased. Thereby, the sheathing material 11 can suppress the covered electric wire 61 or another wire harness from being damaged due to the crest portions 39.

In the below, an example of the using methods of the sheathing material 11 having the above configuration is described.

As shown in FIG. 4, the sheathing material 11 of the first illustrative embodiment is used as the cylindrical sheathing material 43 that is bent towards the backside of the sheet base material along the horizontal folding lines 29, is formed into a cylinder shape having a central axis line along the orthogonal line 41 orthogonal to the horizontal folding lines 29 and is wound on outer peripheral surfaces of the covered electric wires 61. The sheathing material 11 is bent by the hot forming and the sheathing material 11 that is formed to have the cylinder shape as the cylindrical sheathing material 43 is not again recovered to the plane state. The cylindrical sheathing material 43 is used at a state where tips of the cylindrical sheathing material rolled into the cylinder shape are overlapped with each other or have a slit therebetween.

Figure 5:
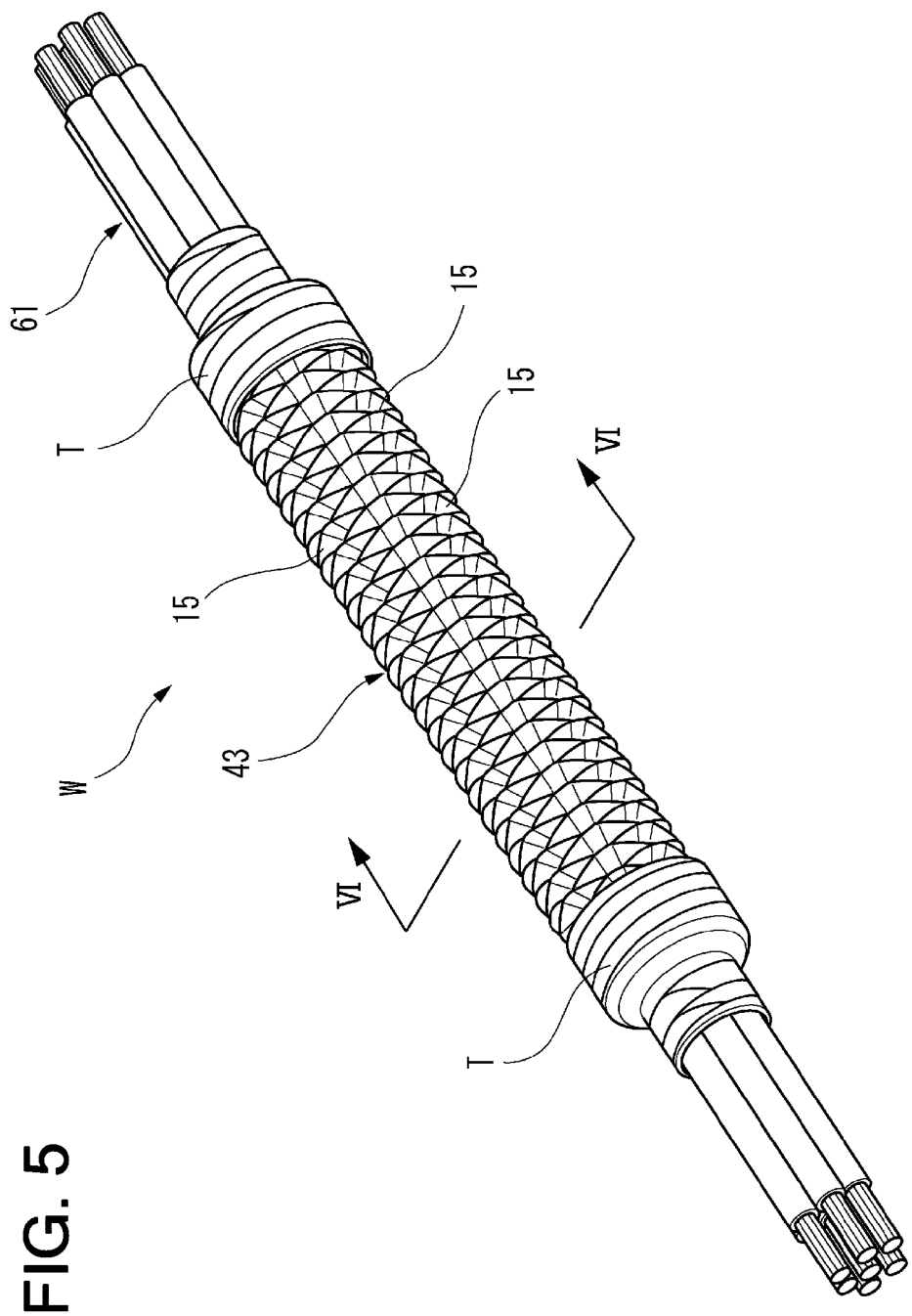
FIG. 5 is a main part perspective view of a wire harness where the cylindrical sheathing material shown in FIG. 4 is wound on outer peripheral surfaces of covered electric wires.

As shown in FIG. 5, the cylindrical sheathing material 43, which is obtained by cutting the sheathing material 11 into a predetermined length and is then wound on the outer peripheral surfaces of the covered electric wires 61, is fixed at both axial ends thereof by an adhesive tape T, so that it is fixed at a predetermined position of the covered electric wires 61 at a state where the slit thereof is prevented from being opened, thereby protecting the covered electric wires 61 from the contact with the external component such as a vehicle body.

Figure 6:
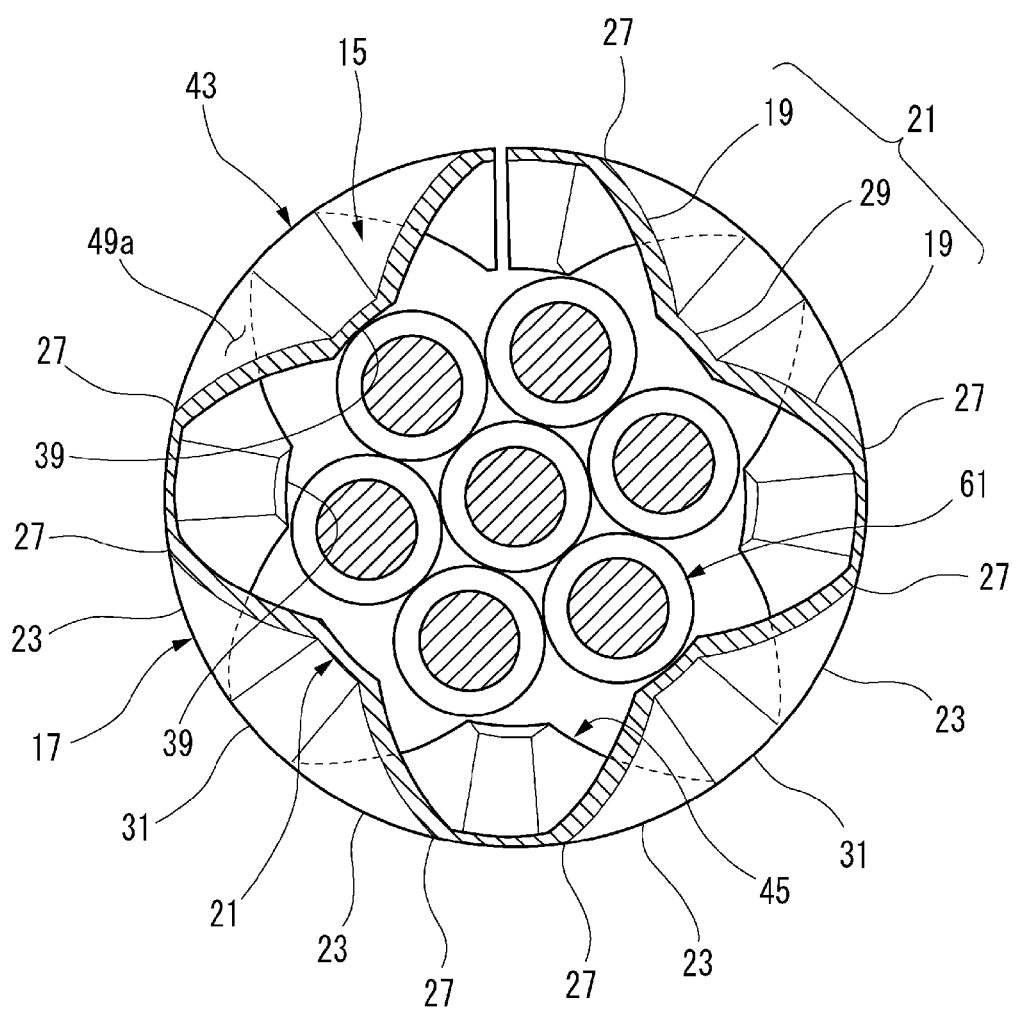
FIG. 6 is a sectional view taken along an arrow VI-VI of the wire harness shown in FIG. 5.

As shown in FIG. 6, regarding the cylindrical sheathing material 43, the sheathing material 11 is rolled into the cylinder shape, so that the crest portions 39, which are formed to protrude from the backside of the sheet base material as the concave portions 15 are configured, inwardly protrude. The crest portion 39 inwardly protruding is contacted to the covered electric wire 61, which is accommodated in the cylindrical sheathing material. However, the crest portion 39 is formed to have a back shape of a horse by the trough portion 21 having the horizontal folding line 29, so that a contact area with the covered electric wire 61 is increased and is not sharp.

A length of the horizontal folding line 29 can be adjusted by an inclined angle θ of the inclined folding line 19 or a depth of the concave portion 15. That is, the depth of the concave portion 15, the inclined angle θ of the inclined folding line 19 and the length of the horizontal folding line 29 are optimally adjusted in conformity to an outer diameter of the covered electric wire 61 to be protected. Thereby, the horizontal folding line 29 is formed to have an optimal length in conformity to the covered electric wire 61. Thus, the crest portions 39 of the cylindrical sheathing material 43, which protrude towards an inner peripheral surface when the sheathing material 11 is rolled into the cylinder shape so that the backside of the sheet base material is an inside, is configured not to be sharp, so that it is possible to suppress the damage of the covered electric wires 61.

According to the sheathing material 11 of this illustrative embodiment, the concave portions 15 can be easily and continuously formed on the surface of the long sheet base material by a relatively simple embossing processing apparatus having a pair of embossing rollers to be heated. The sheathing material 11 made of the sheet base material on which the concave portions 15 are formed can be easily formed into the cylindrical sheathing material 43 by a relatively simple bending apparatus.

Therefore, the sheathing material 11 of this illustrative embodiment can be easily commercially implemented into the cylindrical sheathing material 43 from the sheet base material by the embossing processing apparatus and bending apparatus equipped in a wire harness assembling factory. As a result, it is possible to convey the sheet base material with being rolled at a state where the volume thereof is not increased and the conveying efficiency is thus high, in the wire harness assembling factory. In this case, preferably, the sheet base material is beforehand subject to slit processing for cutting the same at a predetermined width.

In the meantime, the sheathing material 11 may be wound on the covered electric wires 61, as it is a flat plate shape having the concave portions 15 formed therein, without being formed into the cylindrical sheathing material 43, like the above using method. The wound sheathing material 11 is fixed by the adhesive tape T, a binding band and the like so that it is not developed. In this case, it is not necessary to equip the bending apparatus.

In the below, operations are described when both axial ends of the cylindrical sheathing material 43 wound on the covered electric wires 61 are bend to come close to each other.

When the sheathing material 11 of this illustrative embodiment is bent towards the sheet base material along the horizontal folding lines 29 and is thus formed into the cylindrical sheathing material 43 having a central axis line following the orthogonal line 41 orthogonal to the horizontal folding lines 29, a pair of opposing inner surfaces 49a, 49b of the concave portion 15 is arranged along the central axis line of the cylinder.

Here, as shown in FIGS. 1 and 3, the concave portion 15 of the sheathing material 11 is an inner space portion of a boat-shaped box body 45 formed on the surface of the sheet base material. In the concave portion 15, the respective apexes 37 of the V-shaped ridgelines 23 are connected by the trough portion 21 becoming the continuous folding line of the pair of inclined folding lines 19 and the horizontal folding line 29 connecting the tips of the inclined folding lines 19, when seen from the plan view. The concave portion 15 can be easily deformed and is thus largely deformed in a direction along which the pair of opposing inner surfaces 49a, 49b, which have the trough portion 21 of the boat-shaped box body 45 as a boundary, comes close to or separates from each other. That is, the boat-shaped box body 45 can be largely deformed in the sheet width direction (X direction). On the other hand, the concave portion 15 is difficult to be deformed in the direction (Y direction) along which the pair of apexes 27 comes close to or separates from each other because the inclined folding lines 19 and horizontal folding line 27 of the trough portion 21 act as a bending resistance, so that a deformation amount thereof is small. For this reason, the sheathing material 11 having the concave portions 15 arranged in a line in the horizontal and vertical directions is easily expanded and contracted in the sheet width direction (X direction) at the flat plate state shown in FIG. 1 but is difficult to be expanded and contracted in the sheet length direction (Y direction). Like this, the sheathing material 11 has a directionality as regards the elasticity in the in-plane direction.

Figure 7A:
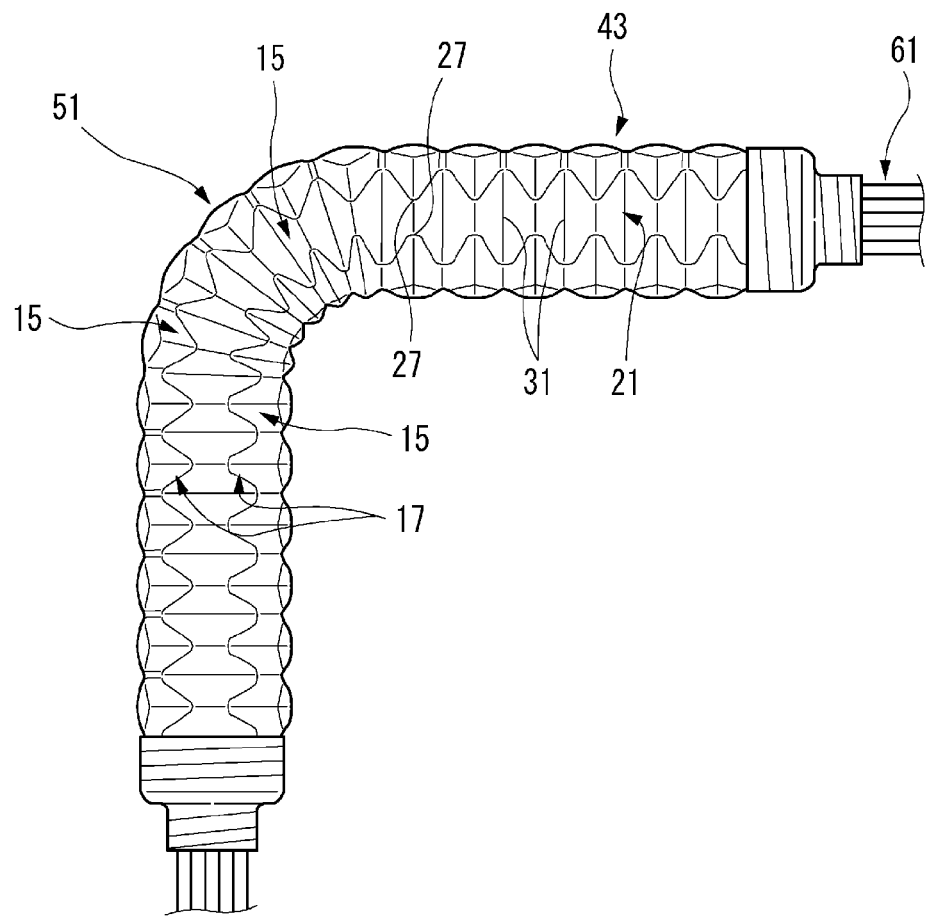
FIG. 7A is a front view of the wire harness that is bent so that both axial ends of the cylindrical sheathing material shown in FIG. 5 come close to each other and FIG. 7B is a main part enlarged view of FIG. 7A.
Figure 7B:
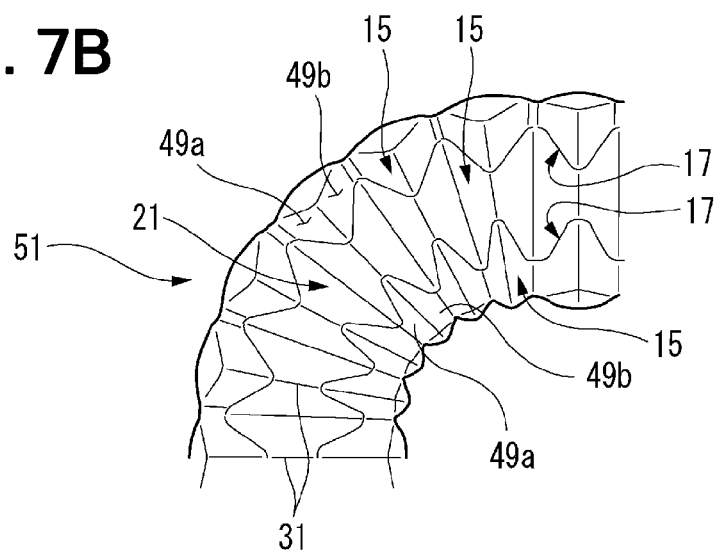

When the cylindrical sheathing material 43 is bent so that both axial ends thereof come close to each other, the stress expanding and contracting the pair of opposing inner surfaces 49a, 49b is applied to the concave portion 15. At this time, the concave portion 15 opening towards the outer peripheral surface can be easily deformed and a deformation amount thereof is thus large in the direction along which the pair of opposing inner surfaces 49a, 49b comes close to or separates from each other. For this reason, as shown in FIGS. 7A and 7B, when the cylindrical sheathing material 43 is bent, the tensile stress is generated at an outer side of a bent part 51, so that the pair of opposing inner surfaces 49a, 49b is expanded with a large deformation amount therebetween, and the compressive force is generated at an inner side of the bent part 51, so that the pair of opposing inner surfaces 49a, 49b is contracted with a large deformation amount therebetween. As a result, it is possible to easily bend the cylindrical sheathing material 43. Hence, it is possible to easily obtain the cylindrical sheathing material 43 that can be freely bent to follow an arranging path of the covered electric wires 61 (refer to FIG. 6).

In contrast, when the sheathing material 11 is rolled to bend towards the surface of the sheet base material along the horizontal folding lines 29 and is thus formed into the cylinder shape having a central axis line following the orthogonal line 41 orthogonal to the horizontal folding lines 29, the pair of opposing inner surfaces 49a, 49b of the concave portion 15 is arranged along the central axis line direction of the cylinder. When the cylindrical sheathing material 11 is bent to bring both axial ends close to each other, the stress expanding and contracting the pair of opposing inner surfaces 49a, 49b is applied to the concave portion 15. At this time, since the concave portion 15 opening towards the inner peripheral surface of the cylinder shape is not easily deformed and the deformation amount is thus small in the direction along which the pair of opposing inner surfaces 49a, 49b comes close to or separates from each other, it is not possible to easily bend the cylindrical sheathing material. Therefore, when the sheathing material 11 is rolled to bend towards the surface of the sheet base material along the horizontal folding lines 29, the sheathing material 11 can be used as the cylindrical sheathing material 11 that is used in an arranging path of the covered electric wires 61 for which linearity retention is required.

Also, when the sheathing material 11 is rolled to bend towards the backside or surface of the sheet base material along the orthogonal line 41 orthogonal to the horizontal folding lines 29 and is thus formed into the cylinder shape having a central axis line following the horizontal folding lines 29, the pair of apexes 27 is arranged along the central axis line direction of the cylinder. When the cylindrical sheathing material 11 is bent to bring both axial ends close to each other, the stress expanding and contracting the apexes 27 of the concave portion 15 is applied to the concave portion 15. At this time, since the concave portion 15 is difficult to be deformed and the deformation amount is thus small in the direction along which the pair of apexes 27 comes close to or separates from each other, the cylindrical sheathing material is not easily bent. Therefore, when the sheathing material 11 is rolled to bend towards the backside or surface of the sheet base material along the orthogonal line 41 orthogonal to the horizontal folding lines 29, the sheathing material 11 can be used as the cylindrical sheathing material 11 that is used in an arranging path of the covered electric wires 61 for which linearity retention is required.

Like this, the sheathing material 11 of this illustrative embodiment can be rolled into the cylinder shape towards the surface and backside of the sheet base material and in the direction along which the central axis line of the cylinder is parallel and orthogonal to the horizontal folding lines 29. However, only when the cylindrical sheathing material 11 is bent towards the backside of the sheet base material and is thus rolled into the cylinder shape having the central axis line along the orthogonal line 41, the cylindrical sheathing material 11 can be easily bent. Thereby, the sheathing material 11 having the concave portions 15 for securing the wear resistance can be used as the sheathing material for bending and the sheathing material for linearity by selecting the direction along which the sheathing material is rolled into the cylinder shape.

In the below, a sheathing material 111 of a second illustrative embodiment is described.

Figure 8:
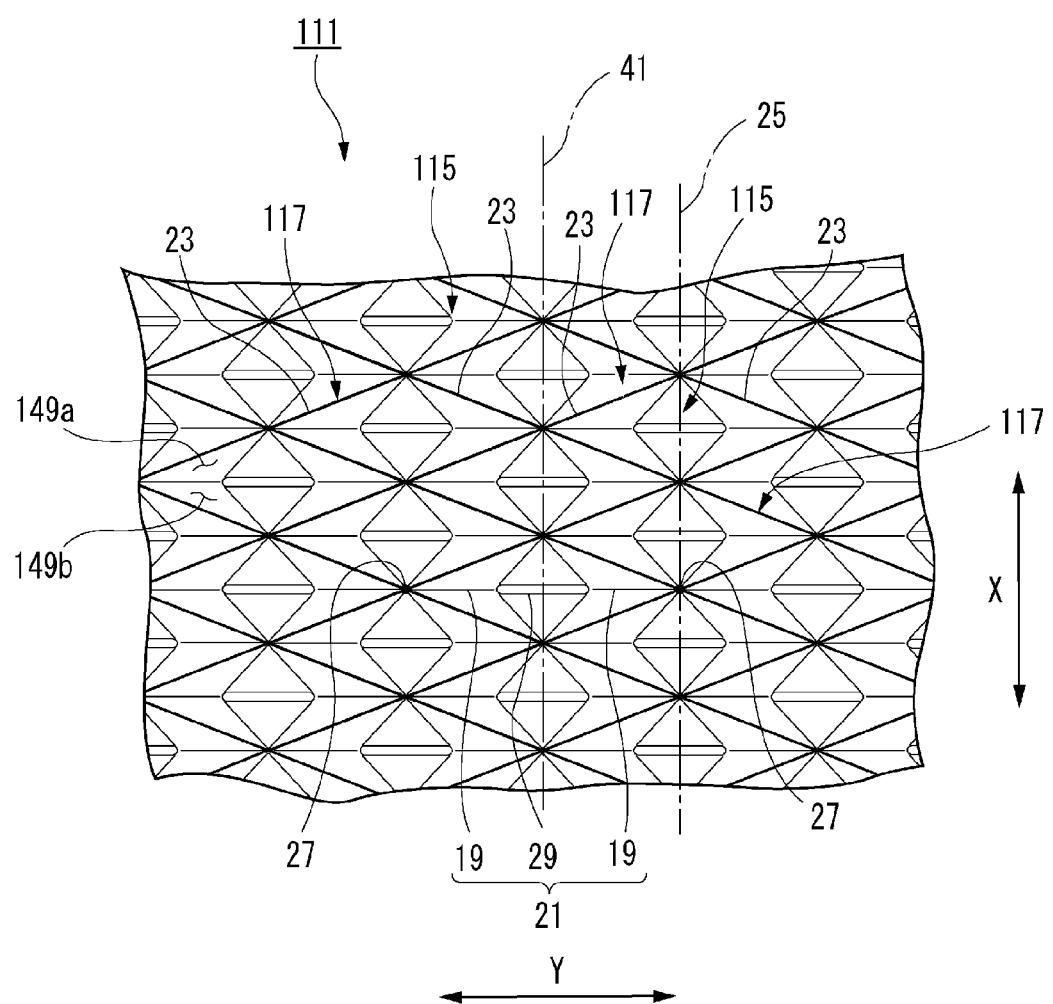
FIG. 8 is a plan view of a sheathing material according to a second illustrative embodiment of the invention.
Figure 9:
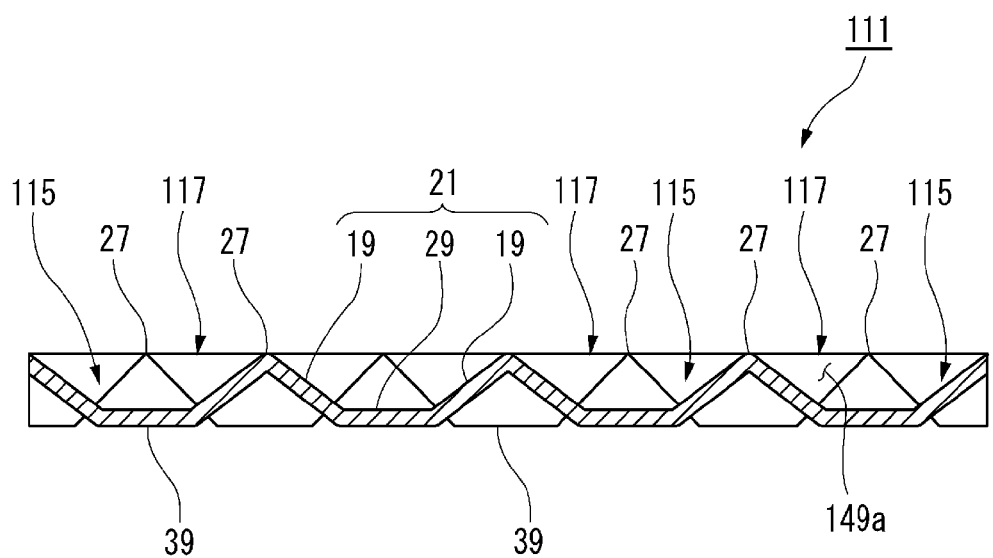
FIG. 9 is a sectional view taken along an arrow IX-IX of the sheathing material shown in FIG. 8.
Figure 10:
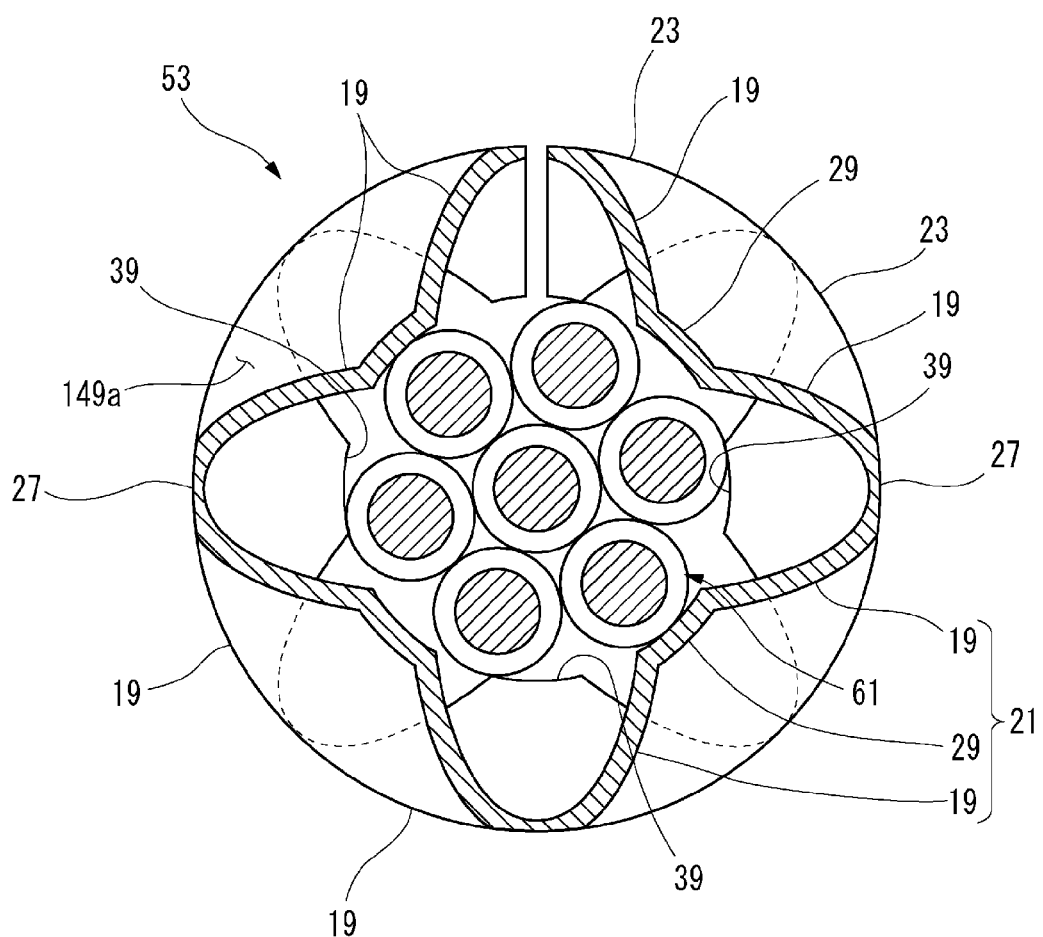
FIG. 10 is a cross sectional view of a wire harness where the sheathing material shown in FIG. 9 is rolled into a cylindrical shape towards a backside along the horizontal folding lines of the concave portions and is then wound on the outer peripheral surfaces of electric wires.

As shown in FIGS. 8 to 10, the sheathing material 111 of the second illustrative embodiment has substantially the same configuration as the sheathing material 11 of the first illustrative embodiment, except that concave portions 115 other than the concave portions 15 are formed on the surface of the sheet base material by the embossing processing. Hence, the same constitutional parts are denoted with the same reference numerals and the descriptions thereof are omitted.

In the second illustrative embodiment, the sheathing material 111 has a plurality of concave portions 115 having the same shape, which are regularly and continuously formed to be adjacent into a zigzag shape in horizontal and vertical directions on a surface of a long sheet base material (not shown), which is slit at a predetermined width, by the embossing processing.

As shown in FIG. 8, each lattice portion 117 of the second illustrative embodiment has the pair of V-shaped ridgelines 23, when seen from the plan view, is symmetrically arranged with respect to the boundary line 25 extending in the sheet width direction (X direction) so that V-shaped opening-sides thereof are opposed to each other, and forms a polygon on the surface of the sheet base material. That is, the concave portions 115 of the sheathing material 111 of the second illustrative embodiment are configured so that each lattice portion 117 forms a rhombic shape, when seen from the plan view. The lattice portion 117 of the concave portion 115 having a rhombic shape, when seen from the plan view, has such a configuration that each apex 27 of the V-shaped ridgeline 23 is formed by intersecting four ridgelines, when seen from the plan view.

In the below, operations of the sheathing material 111 having the above configuration are described.

According to the sheathing material 111 of the second illustrative embodiment, the concave portions 115, which are regularly adjacent to each other, are formed on the surface of the sheet base material by the embossing processing, and the pair of V-shaped ridgelines 23 are connected to each other, when seen from the plan view, so that the rhombic lattice portions 117 becoming the ridgelines of the concave portions 115 are arranged on the same plane as the surface of the sheet base material. That is, when seeing the sheathing material 111 from the backside with the inside and outside thereof reversed, the concave portions 15 are formed, so that the crest portions 39 (refer to FIGS. 9 and 10) protrude from the backside. Hence, the surface and backside of the sheathing material 111 made of the sheet base material are formed with the unevenness for securing the wear resistance by the low-price embossing processing.

Also, on the surface of the sheathing material 111, the rhombic lattice portions 117 where the concave portions 15, each of which having the pair of V-shaped ridgelines 23, when seen from the plan view, are regularly arranged in the horizontal and vertical directions, and the inclined folding lines 19 and the horizontal folding lines 29 of the trough portions 21 becoming the continuous folding lines are configured. Thus, compared to the sheathing material of the related art where the corrugated plate sheet having the concave and convex portions alternately arranged is rolled so that the concave and convex portions are alternately arranged in the tube axis line direction, the sheathing material 111 having the concave portions 115 formed on the sheet base material can be easily bent about the horizontal folding lines 29 or the orthogonal line 41 orthogonal to the horizontal folding lines 29, so that it can be rolled into a polygonal cylinder shape. Hence, the sheathing material 111 made of the sheet base material can be conveyed with being stacked, so that a volume thereof is not increased and the conveying efficiency is thus improved. This is the same operational effect as the sheathing material 11 of the first illustrative embodiment.

As shown in FIG. 10, the sheathing material 111 of the second illustrative embodiment is used as a cylindrical sheathing material 53 that is bent towards the backside of the sheet base material along the horizontal folding lines 29, is formed into the cylinder shape having a central axis line following the orthogonal line 41 orthogonal to the horizontal folding lines 29 and is wound on the outer peripheral surfaces of the covered electric wires 61. The sheathing material 111 is bent by the hot forming and the sheathing material 111 that is formed to have the cylinder shape as the cylindrical sheathing material 53 is not again recovered to the plane state. The cylindrical sheathing material 53 is used at a state where the tips of the cylindrical sheathing material rolled into the cylinder shape are overlapped with each other or have a slit therebetween.

When the cylindrical sheathing material 53 is bent so that both axial ends thereof come close to each other, the stress expanding and contracting a pair of opposing inner surfaces 149a, 149b is applied to the concave portion 115. At this time, the concave portion 15 opening towards the outer peripheral surface can be easily deformed and the deformation amount is thus large in the direction along which the pair of opposing inner surfaces 149a, 149b comes close to or separates from each other. For this reason, when the cylindrical sheathing material 53 is bent, the tensile stress is generated at an outer side of the bent part, so that the pair of opposing inner surfaces 149a, 149b is expanded with a large deformation amount therebetween, and the compressive force is generated at an inner side of the bent part, so that the pair of opposing inner surfaces 149a, 149b is contracted with a large deformation amount therebetween. As a result, it is possible to easily bend the cylindrical sheathing material 53. Hence, it is possible to easily obtain the cylindrical sheathing material 53 that can be freely bent to follow an arranging path of the covered electric wires 61.

In the below, an example where a wire harness 73 using a sheathing material 57 for collective mounting according to a third illustrative embodiment is used is described.

Figure 11A:
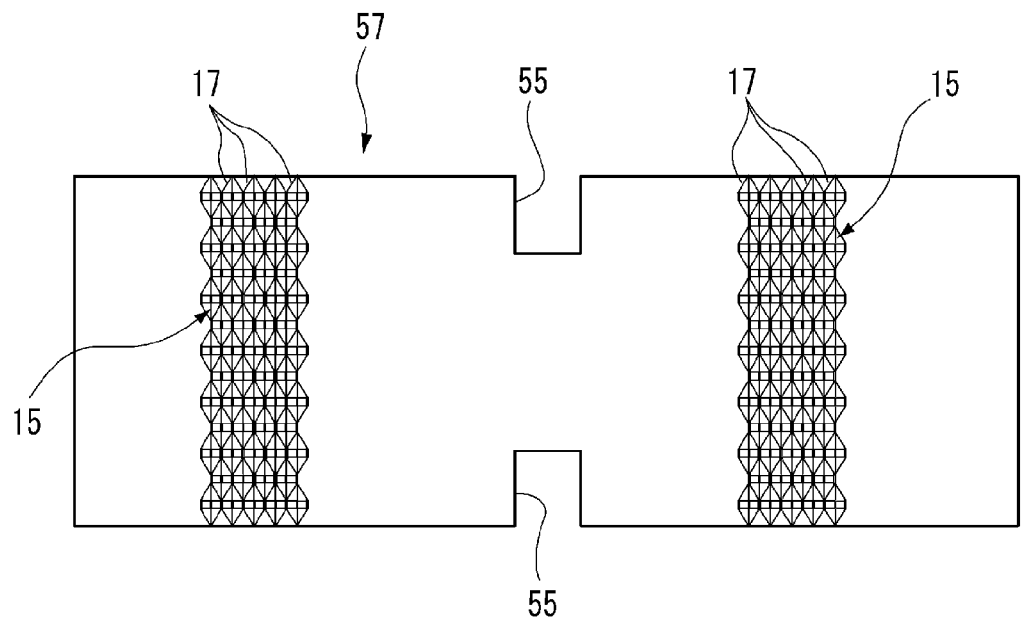
FIG. 11A is a plan view of a sheathing material for collective mounting where concave portions are partially formed and notch portions for a branch electric wire are formed and FIG. 11B is a main part perspective view of a wire harness that is assembled using the sheathing material for collective mounting shown in FIG. 11A.
Figure 11B:
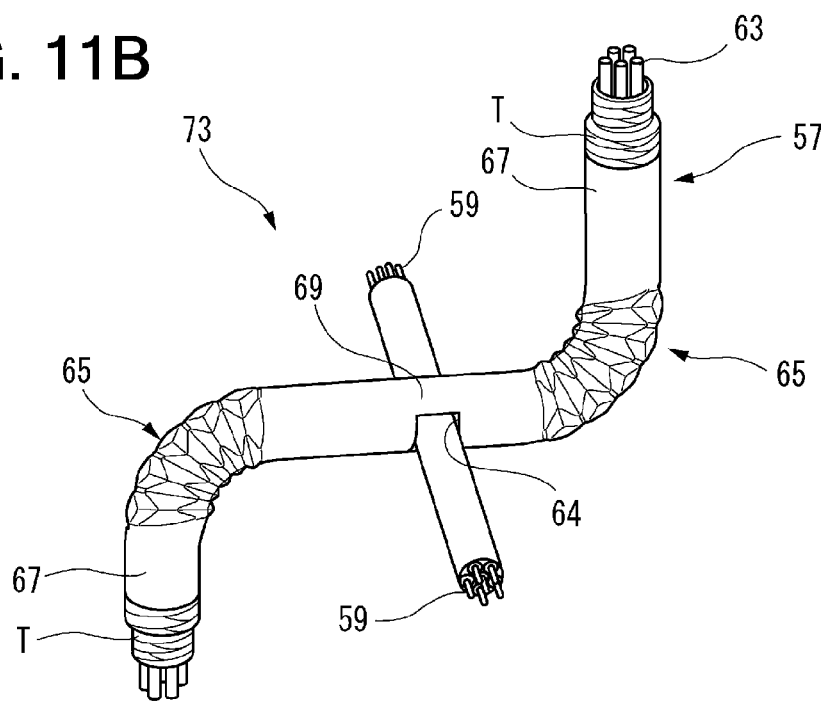

FIG. 11A is a plan view of the sheathing material 57 for collective mounting where the lattice portions 17 are partially formed and notch portions 55 for a branch electric wire are formed and FIG. 11B is a partial perspective view of the wire harness 73 that is assembled using the sheathing material 57 for collective mounting shown in FIG. 11A.

As shown in FIG. 11A, the sheathing material 57 is formed with the plurality of concave portions 15 in a desired range of the sheet base material. Hence, by the above operations, a formation area of the concave portions 15 can be easily bent and an area where the concave portions 15 are not formed cannot be easily bent. Also, the notch portions 55 are formed at desired positions, so that it is possible to secure lead-out ports 64 for a branch electric wire 59 when the sheathing material 57 is rolled into a cylinder shape.

As shown in FIG. 11B, the sheathing material 57 for collective mounting where the concave portions 15 are partially formed and the notch portions 55 are provided is fixed by the tape T or binding band with backbone electric wires 63 being covered after drawing out the branch electric wire 59 through the lead-out ports 64. The sheathing material 57 for collective mounting may have a flat plate shape or cylinder shape.

When the wear resistance, the linearity, the bendability (flexibility) and the electric wire branch are required by other portions of the wire harness of the related art, a variety of corrugated tubes, protectors, branch tubes and the like are mounted to the wire harness in conformity to the requirements.

In contrast, when the sheathing material 57 for collective mounting according to the third illustrative embodiment is used, it is possible to configure the wire harness 73 having a bendable part 65, a linearity retention part 67 and a branch part 69 by one member. As a result, it is possible to avoid duplication of the members and to implement the integral structure of the wire harness 73. Also, it is possible to perform the collective mounting, thereby saving the human resources.

Therefore, according to the sheathing material 11, 111, 57 of the above illustrative embodiments, the sheet base material where the unevenness is formed thereon by the low-price embossing processing can be conveyed with being stacked, so that it is possible to reduce the manufacturing and logistics costs.

In the meantime, the invention is not limited to the above illustrative embodiments and can be appropriately modified and improved. In addition, the materials, shapes, sizes, the number, the arrangement positions and the like of the respective constitutional elements in the above illustrative embodiments are arbitrary and are not particularly limited inasmuch as the invention can be implemented.

What is claimed is:

1. A sheathing material comprising a sheet base material on which a plurality of concave portions is regularly formed to be adjacent to each other by embossing processing,
    wherein each concave portion includes:
        a polygonal lattice portion that is formed on a front side surface of the sheet base material and includes a pair of V-shaped ridgelines, when seen from a plan view of the sheathing material, the pair of V-shaped ridgelines being symmetrically arranged with respect to a symmetrical axis so that opening-sides of the V-shaped ridgelines are opposed to each other; and
        a trough portion that includes a pair of inclined folding lines extending to come close to each other and inclined towards a backside of the sheet base material from respective apexes of the V-shaped ridgelines, when seen from the plan view, and a horizontal folding line connecting tips of the inclined folding lines.

2. The sheathing material according to claim 1, wherein the concave portion has horizontal ridgelines that connect respective V-shaped opening-side ends of the V-shaped ridgelines and extend in parallel with the horizontal folding line, when seen from the plan view.

3. The sheathing material according to claim 1, wherein the sheathing material is configured to be bent towards the backside of the sheet base material along the horizontal folding line to be formed into a cylinder shape and to be wound onto an outer peripheral surface of at least one electric wire.

4. A wire harness comprising the sheathing material of claim 1 and at least one electric wire having an outer peripheral surface on which the sheathing material is configured to be wound.

5. The sheathing material according to claim 1, wherein the polygonal lattice portions are arranged on the same plane as the front side surface of the sheet base material.

6. The sheathing material according to claim 1, wherein the sheathing material is stackable on the other sheathing material where the concave portions of the sheathing material are configured to be inserted into concave portions of the other sheathing material.

* * * * *